US012618375B2

(12) United States Patent
Jupudi et al.

(10) Patent No.: US 12,618,375 B2
(45) Date of Patent: May 5, 2026

(54) SYSTEMS AND METHODS FOR ESTIMATING INTEGRITY AND EFFICIENCY OF AN INLET FILTRATION SYSTEM FOR TURBINE SYSTEMS AND FOR RECOMMENDING MITIGATION ACTIONS

(71) Applicant: GENERAL ELECTRIC COMPANY, Schenectady, NY (US)

(72) Inventors: Maruthi Manohar Jupudi, Dubai (AE); Kamel Abdelkader Tayebi, Khobar (SA); Abdurrahman Abdallah Khalidi, Dubai (AE); Jose Antonio Cuevas Alvarez, Baden (CH); Alston Ilford Scipio, Mableton, GA (US); Bradly Aaron Kippel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 943 days.

(21) Appl. No.: 17/387,601

(22) Filed: Jul. 28, 2021

(65) Prior Publication Data

US 2023/0033140 A1 Feb. 2, 2023

(51) Int. Cl.
*F02C 9/00* (2006.01)
*B01D 46/00* (2022.01)
(Continued)

(52) U.S. Cl.
CPC ............ *F02C 9/00* (2013.01); *B01D 46/0086* (2013.01); *B01D 46/444* (2013.01);
(Continued)

(58) Field of Classification Search
CPC ......... F02C 9/00; F02C 7/05; B01D 46/0086; B01D 46/444; B01D 45/08;
(Continued)

(56) References Cited

U.S. PATENT DOCUMENTS 6,254,341 B1    7/2001 Ackerman et al.
7,527,674 B1 *  5/2009 Janawitz ................. B03C 3/363
                                                          96/57
(Continued)

FOREIGN PATENT DOCUMENTS

CN         113176191          7/2021
DE    102017104469 A1 *  9/2018  .............. F01N 11/00
(Continued)

OTHER PUBLICATIONS

Hanachi et al. "Performance-Based Gas Turbine Health Monitoring, Diagnostics, and Prognostics: A Survey", IEEE Transactions on Reliability, vol. 67, No. 3, Sep. 2018. (Year: 2018).*
(Continued)

*Primary Examiner* — Eman A Alkafawi
*Assistant Examiner* — Dilara Sultana
(74) *Attorney, Agent, or Firm* — Grogan, Tuccillo & Vanderleeden, LLP

(57) ABSTRACT

A control system for turbine systems configured to provide accurate interpretations of detected particle accumulation, improve performance of turbine systems, and/or minimize costs due to downtime and maintenance are disclosed. The control system may build an intelligent model of fluid flow based on measured data provided by a sensor in a fluid flow path of the turbine system. The intelligent model consults a filter efficiency framework and determines an impact value that quantifies an operational efficiency of the turbine system and may identify a location of possible leakage, estimate a total amount of ingress of particles, identify components of the turbine system that may be operating in a diminished capacity, estimate a risk of damage to components of the turbine system, and/or recommend mitigation actions.

26 Claims, 10 Drawing Sheets

(51) Int. Cl.

| | |
|---|---|
| *B01D 46/44* | (2006.01) |
| *F01D 21/00* | (2006.01) |
| *G06N 5/00* | (2023.01) |
| *G06Q 10/20* | (2023.01) |
| *G06Q 50/06* | (2024.01) |

(52) U.S. Cl.
CPC ............. *F01D 21/003* (2013.01); *G06N 5/00* (2013.01); *G06Q 10/20* (2013.01); *G06Q 50/06* (2013.01); *F05D 2230/80* (2013.01); *F05D 2270/01* (2013.01); *F05D 2270/3061* (2013.01); *F05D 2270/709* (2013.01)

(58) Field of Classification Search
CPC .. B01D 46/0032; B01D 46/442; B01D 46/62; B01D 50/20; F01D 21/003; G06N 5/00; G06Q 10/20; G06Q 50/06; F05D 2230/80; F05D 2270/01; F05D 2270/3061; F05D 2270/709; F05D 2230/72; F05D 2260/80; F05D 2260/607
See application file for complete search history.

(56) References Cited

U.S. PATENT DOCUMENTS

| | | | |
|---|---|---|---|
| 7,689,368 | B2 | 3/2010 | Douglas |
| 7,871,287 | B2 | 1/2011 | Hofmann et al. |
| 8,414,676 | B2 | 4/2013 | Hiner et al. |
| 8,475,115 | B2 | 7/2013 | Zhang et al. |
| 9,280,797 | B2 | 3/2016 | Ekanayake et al. |
| 9,556,798 | B2 | 1/2017 | Ekanayake et al. |
| 9,557,246 | B2 | 1/2017 | Ekanayake et al. |
| 9,644,484 | B2 | 5/2017 | Ekanayake et al. |
| 9,718,012 | B2 | 8/2017 | Chung et al. |
| 9,739,168 | B2 | 8/2017 | Ekanayake et al. |
| 9,897,582 | B2 | 2/2018 | Jean et al. |
| 10,220,353 | B2 | 3/2019 | Taylor |
| 10,272,475 | B2 | 4/2019 | Scipio et al. |
| 10,724,398 | B2 | 7/2020 | Zhang et al. |
| 10,780,385 | B2 | 9/2020 | Kippel et al. |
| 11,125,168 | B2 | 9/2021 | Hanlon et al. |
| 2004/0000186 | A1* | 1/2004 | Hagg .................. G01M 3/226 |
| | | | 73/38 |
| 2008/0016971 | A1* | 1/2008 | Bunce .................. F01D 21/003 |
| | | | 73/114.74 |
| 2008/0201104 | A1* | 8/2008 | Poncet .............. G05B 23/0278 |
| | | | 702/181 |
| 2010/0288034 | A1 | 11/2010 | Agrawal et al. |
| 2014/0123621 | A1 | 5/2014 | Driessens et al. |
| 2015/0007574 | A1* | 1/2015 | Morgan ................... F02C 9/00 |
| | | | 60/39.091 |
| 2015/0275738 | A1* | 10/2015 | Van Nieuwstadt .... B01D 46/30 |
| | | | 73/114.76 |
| 2017/0298286 | A1 | 10/2017 | Nowak et al. |
| 2017/0312673 | A1 | 11/2017 | Smith et al. |
| 2018/0032000 | A1 | 2/2018 | Shinkawa et al. |
| 2018/0068498 | A1 | 3/2018 | Hodge |
| 2018/0073386 | A1* | 3/2018 | Zhang ................... F01D 25/002 |
| 2018/0073389 | A1 | 3/2018 | Zhang et al. |
| 2018/0230907 | A1* | 8/2018 | Ewens ..................... F02C 9/00 |
| 2018/0252140 | A1* | 9/2018 | Mandausch ...... F02M 35/10386 |
| 2018/0291820 | A1* | 10/2018 | Zhang ...................... F02C 7/12 |
| 2019/0025813 | A1* | 1/2019 | Cella ...................... G06N 3/006 |
| 2019/0160404 | A1 | 5/2019 | Smithies |
| 2019/0224596 | A1 | 7/2019 | Kariveti et al. |
| 2019/0226401 | A1 | 7/2019 | Heeter et al. |
| 2019/0330998 | A1* | 10/2019 | Griffiths ............... F01D 21/003 |
| 2020/0073348 | A1 | 3/2020 | Weber et al. |
| 2020/0131996 | A1* | 4/2020 | Hanlon ................. F04D 27/001 |
| 2020/0224550 | A1* | 7/2020 | Dischinger ............ F01D 21/10 |
| 2020/0271561 | A1 | 8/2020 | Lavrovsky et al. |
| 2021/0231053 | A1 | 7/2021 | Mohr et al. |

FOREIGN PATENT DOCUMENTS

| | | |
|---|---|---|
| EP | 3643904 | 4/2020 |
| EP | 3643905 | 4/2020 |
| WO | 2022023253 | 2/2022 |
| WO | 2022023256 | 2/2022 |

OTHER PUBLICATIONS

Kiakojoor et. al. "Dynamic neural networks for gas turbine engine degradation prediction, health monitoring and prognosis", Neural Comput & Applic (2016) 27:2157-2192 (Year: 2016).*

Extended European Search Report dated Jan. 3, 2023 from corresponding European Application No. 22184518.3.

European Search Report dated Dec. 15, 2022 from corresponding European Application No. 22184512.6.

* cited by examiner

FIG. 3

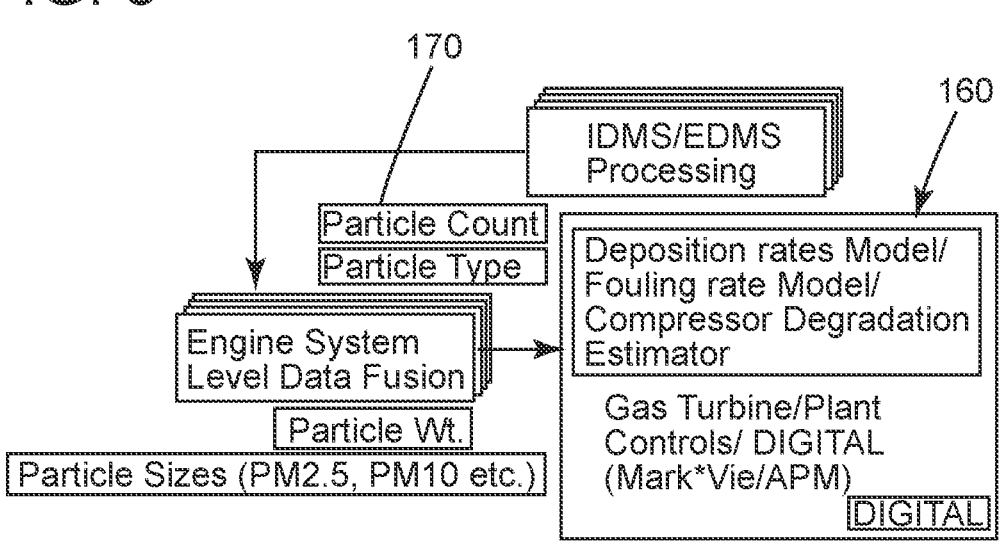

170

160

IDMS/EDMS Processing

Particle Count
Particle Type

Engine System Level Data Fusion

Particle Wt.

Particle Sizes (PM2.5, PM10 etc.)

Deposition rates Model/ Fouling rate Model/ Compressor Degradation Estimator

Gas Turbine/Plant Controls/ DIGITAL (Mark*Vie/APM)

DIGITAL

FIG. 4

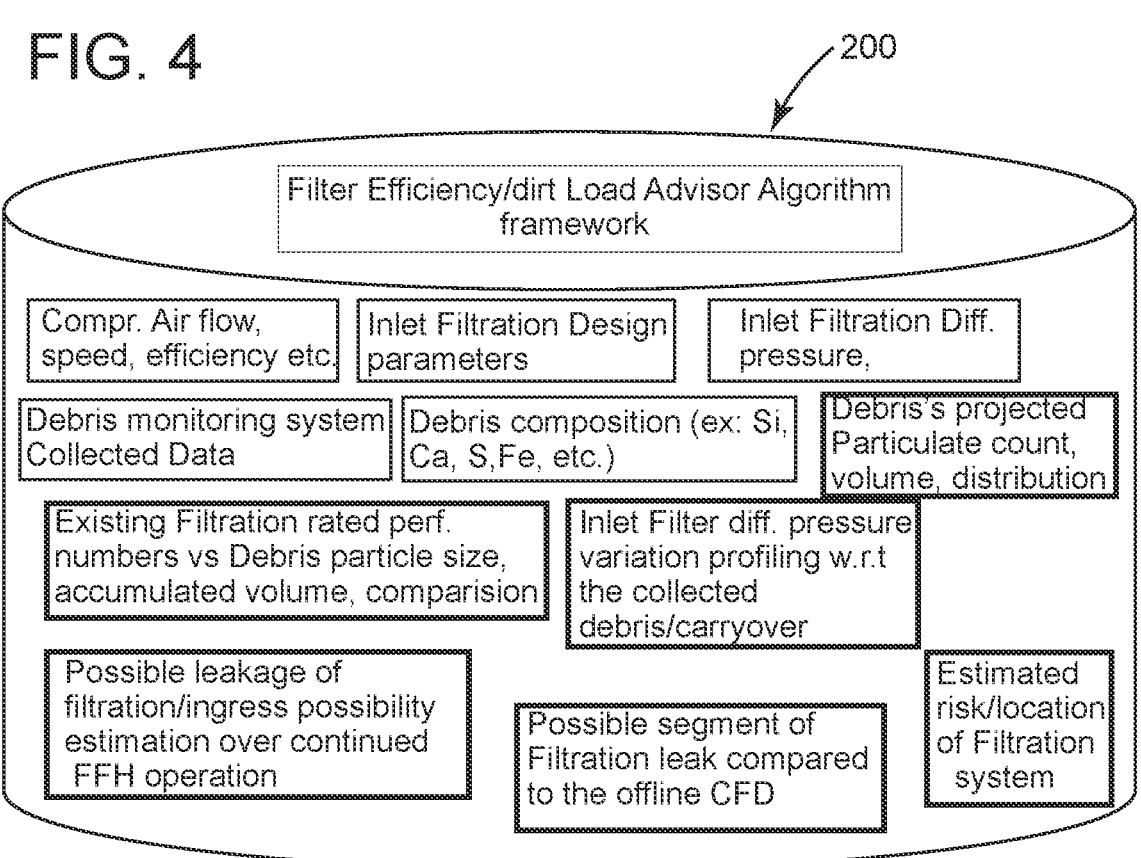

200

Filter Efficiency/dirt Load Advisor Algorithm framework

Compr. Air flow, speed, efficiency etc.

Inlet Filtration Design parameters

Inlet Filtration Diff. pressure,

Debris monitoring system Collected Data

Debris composition (ex: Si, Ca, S,Fe, etc.)

Debris's projected Particulate count, volume, distribution

Existing Filtration rated perf. numbers vs Debris particle size, accumulated volume, comparision Inlet Filter diff. pressure variation profiling w.r.t the collected debris/carryover Possible leakage of filtration/ingress possibility estimation over continued FFH operation Possible segment of Filtration leak compared to the offline CFD Estimated risk/location of Filtration system

| Table 2 | |
| --- | --- |
| Geometric Mean Particle Size (Micron) | Particle Size Removal Efficiency % (per ASHRAE 52.2) |
| 0.35 | 7.7 |
| 0.47 | 16.0 |
| 0.62 | 24.4 |
| 0.84 | 34.0 |
| 1.14 | 46.3 |
| 1.44 | 55.1 |
| 1.88 | 67.9 |
| 2.57 | 79.1 |
| 3.46 | 87.0 |
| 4.69 | 90.6 |
| 6.20 | 92.5 |
| 8.37 | 94.1 |

FIG. 7

| Controlled particle size | MERV | ANSI/ASHRAE Standard 52.2 Average minimum composite efficiency | | | ASHRAE Standard 52.2 Average arrestance | ASHRAE Standard 52.1 Average dust-spot efficiency | IEST-RP-CC001.3 Type | IEST-RP-CC001.3 Removal efficiency at particle size | Minimum Final Resistance |
| | | E₁ (0.3-1.0μm) | E₂ (1.0-3.0μm) | E₃ (3.0-10.0μm) | | | | | |
|---|---|---|---|---|---|---|---|---|---|
| >10.0 μm | 1 | n/a | n/a | <20% | <65% | <20% | n/a | n/a | 75 Pa |
| | 2 | n/a | n/a | <20% | 65 to 70% | <20% | n/a | n/a | |
| | 3 | n/a | n/a | <20% | 70 to 75% | <20% | n/a | n/a | |
| | 4 | n/a | n/a | <20% | 75 to 80% | <20% | n/a | n/a | |
| 3.0 to 10.0 μm | 5 | n/a | n/a | 20 to 35% | 80 to 85% | <20% | n/a | n/a | 150 Pa |
| | 6 | n/a | n/a | 35 to 50% | 85 to 90% | <20% | n/a | n/a | |
| | 7 | n/a | n/a | 50 to 70% | >90% | 25 to 30% | n/a | n/a | |
| | 8 | n/a | n/a | >70% | >90% | 30 to 35% | n/a | n/a | |
| 1.0 to 3.0 μm | 9 | n/a | <50% | >85% | >90% | 40 to 45% | n/a | n/a | 250 Pa |
| | 10 | n/a | 50 to 65% | >85% | >95% | 50 to 55% | n/a | n/a | |
| | 11 | n/a | 65 to 80% | >85% | >95% | 60 to 65% | n/a | n/a | |
| | 12 | n/a | >80% | >90% | >95% | 70 to 75% | n/a | n/a | |
| 0.3 to 1.0 μm | 13 | <75% | >90% | >90% | >98% | 80 to 90% | n/a | n/a | 350 Pa |
| | 14 | 75 to 85% | >90% | >90% | >98% | 90 to 95% | n/a | n/a | |
| | 15 | 85 to 95% | >90% | >90% | n/a | >95% | n/a | n/a | |
| | 16 | >95% | >95% | >95% | n/a | n/a | n/a | n/a | |
| <0.3 μm | 17 | n/a | n/a | n/a | n/a | n/a | A | 99.97% at 0.3 μm | n/a |
| | 18 | n/a | n/a | n/a | n/a | n/a | C | 99.99% at 0.3 μm | |
| | 19 | n/a | n/a | n/a | n/a | n/a | D | 99.999% at 0.3 μm | |
| | 20 | n/a | n/a | n/a | n/a | n/a | F | 99.999% 0.1 to 0.2 μm | |

Figure 9B:
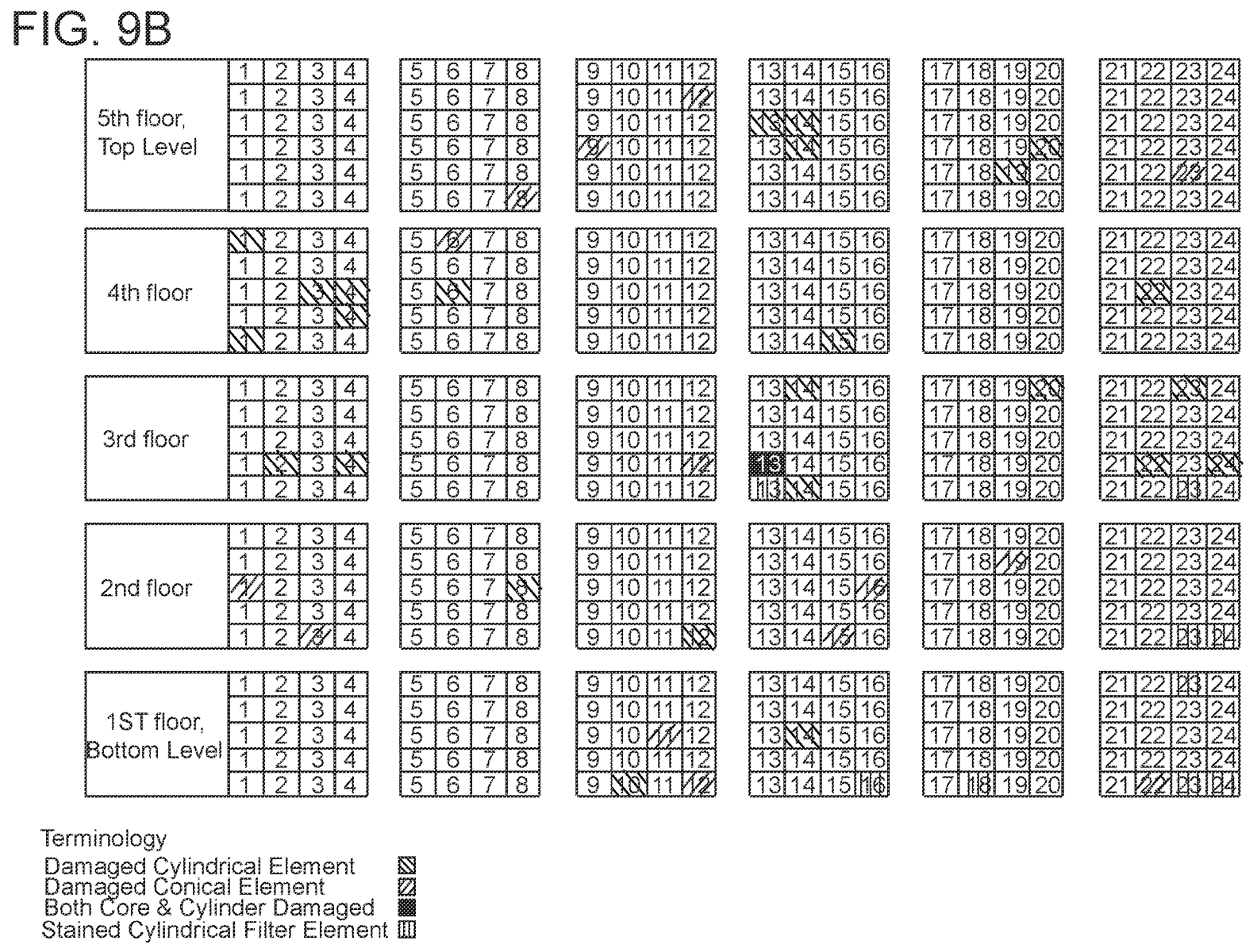

5th floor,
Top Level

4th floor

3rd floor

2nd floor

1ST floor,
Bottom Level

Terminology
Damaged Cylindrical Element
Damaged Conical Element
Both Core & Cylinder Damaged
Stained Cylindrical Filter Element FIG. 10   Digital method for estimating Filtration efficiency of the Gas turbine/Combustion inlet filtration system
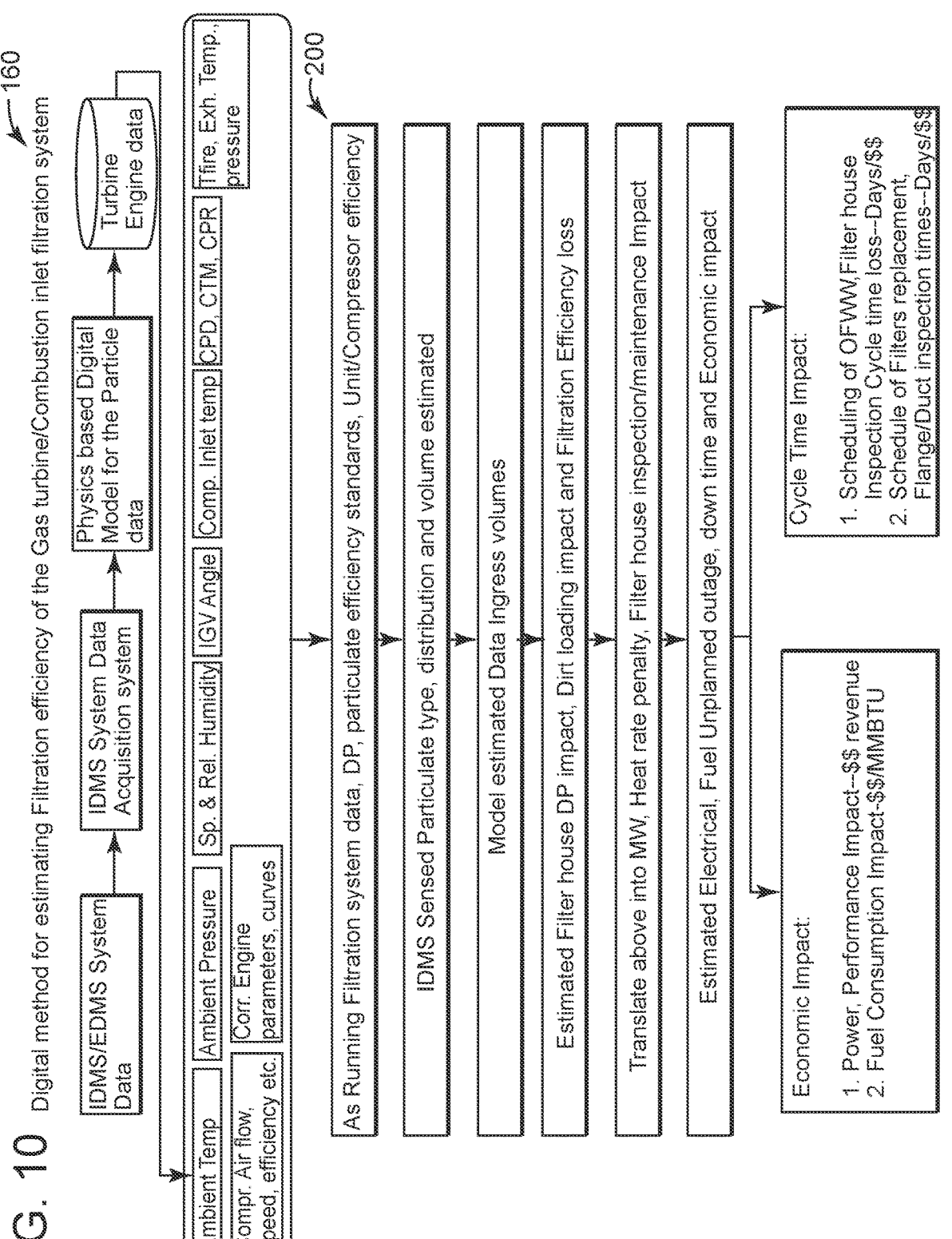

SYSTEMS AND METHODS FOR ESTIMATING INTEGRITY AND EFFICIENCY OF AN INLET FILTRATION SYSTEM FOR TURBINE SYSTEMS AND FOR RECOMMENDING MITIGATION ACTIONS

BACKGROUND

The disclosure relates generally to systems and methods for turbine systems, and more particularly, to systems and methods configured to build and consult an intelligent model of particulate presence and accumulation within gas turbine systems to quantify an operational efficiency of the gas turbine system and may identify a location of possible leakage, estimate a total amount of ingress of particles, identify components of the gas turbine system that may be operating in a diminished capacity, estimate a risk of damage to components of the gas turbine system, and/or recommend mitigation actions.

Gas turbines are used throughout the world in many diverse applications and environments. This diversity creates a number of challenges to air filtration systems, necessitating different particle accumulation estimates and/or estimates of effects on components of the gas turbine system for each type of environmental contaminant(s), gas turbine platform technology, and/or fuel quality. For example, gas turbines which operate in hot and harsh climates, in environments in which the turbine is exposed to severe air quality contaminations, and/or high efficiency gas turbines operating at high operational temperatures, face significant challenges with respect to engine performance, reliability, and/or maintainability, particularly where there is a compromise or breach in the inlet system of the gas turbine system. Such challenges may include the erosion, corrosion and/or failure of various turbine components.

Different operating environments for gas turbines having substantially different structures cannot be adequately monitored by an operator of the turbine system with a single, common monitoring system. When conventional filtration systems fail, and sand and other undesirable particles can enter the gas turbine and the components of the turbine may become damaged and/or inoperable. Additionally, undesirable particles flowing through components of the gas turbine may reduce the operational efficiency of the turbine itself.

To prevent debris and/or particles from entering the turbine, the filtration systems typically include multiple stages of filtration components that filter various sizes of debris and/or particles prior to the working fluid (e.g., filtered air) entering the compressor of the gas turbine. However, these components included in conventional filtration systems can become damaged by the same debris and may no longer filter out the debris and particles as desired. Additionally, or alternatively, the components included in conventional filtration systems may not operate as desired (e.g., filter out debris) due to improper installation, extended operational life or use, and/or other degradation factors.

In conventional turbines, there is no warning or indication system that relates such filtration components being damaged and/or inoperable to an overall cost to replace, perform maintenance, and/or to recommend mitigation actions. Likewise, conventional turbines typically do not provide for predictive filter maintenance. As such, it is only when components of the gas turbine become damaged/altered, and/or when operational efficiency of the turbine degrades to a significant degree that an operator of the turbine may determine that components of the filtration system need repair and/or replacement. Additionally, in order to repair the damaged filtration components of the filtration system, the filtration system, or even the entire turbine, must be shut down for maintenance on the damaged filtration components and/or the damaged components of the turbine, resulting in a significant loss of power and/or revenue generation.

BRIEF DESCRIPTION

A first aspect of the disclosure provides a system for assessing the efficiency and integrity of an inlet filtration system of a turbine. The system includes one or more sensors that generate at least one measured data value of air intake particles within a fluid flow path of the turbine and a controller electrically communicating with the sensor(s). The controller utilizes an intelligent model to process the at least one measured data value. The intelligent model consults a filter efficiency framework that relates the at least one data value of the air intake particles to a filter efficiency of the air filtration system of the turbine.

A second aspect of the disclosure provides a method of quantifying an effect of continued fluid flow within an air filtration assembly of a turbine system. The method includes: consulting an intelligent model of fluid flow tailored to the turbine system; determining an impact value using the intelligent model of fluid flow based on at least one detected data value of an air intake particle traveling through a fluid flow path of the turbine system; calculating a key performance indicator from the impact value; and notifying an operator of the turbine system of the key performance indicator. The key performance indicator provides quantifiable advisory analytics of a revenue loss due to inefficient operation of the turbine system, a cost of replacing an element of the turbine system, and/or a cost of a shutdown of the turbine system for a set time period.

A third aspect of the disclosure provides a controller for a turbine system having at least one sensor. The controller receives at least one measured data value of air intake particles within a fluid flow path of the turbine system and uses an intelligent model to process the at least one data value to generate an impact value including an efficiency of flow of intake air and an effect of particle accumulation on the turbine system. The impact value relates the at least one measured data value to an operational efficiency of the turbine system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows a detailed view of an intelligent model, according to embodiments of the disclosure;

FIG. 4 shows a detailed view of a filter efficiency framework, according to embodiments of the disclosure;

FIG. 7 shows another table of known data consulted by an intelligent model, according to embodiments of the disclosure;

FIGS. 9A and 9B show a computer-generated diagram of sand particle tracks from a weather hood to a compressor inlet of a turbine system and a graphical display view of determinations made by an intelligent model based on a filter efficiency framework, according to additional embodiments of the disclosure;

FIG. 10 shows a flow chart of an intelligent model including key performance indicators, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Figure 1:
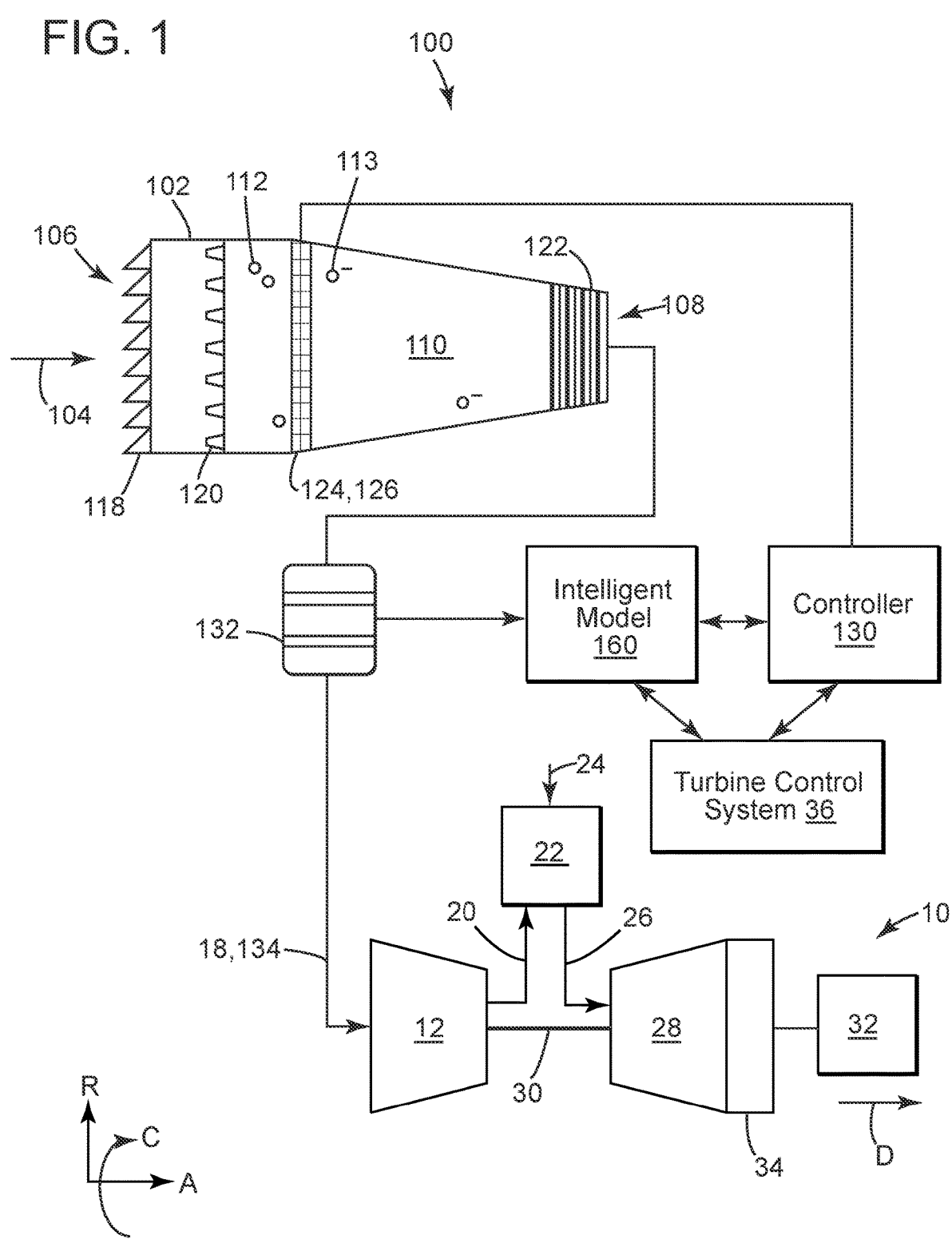
FIG. 1 shows a schematic view of a turbine system and an air filtration assembly including a control system interpreting an intelligent model, according to embodiments of the disclosure.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward"

and "aft," respectively. It is often required to describe parts that are at differing radial R, axial A and/or circumferential C positions (FIG. 1).

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

As indicated above, the disclosure relates generally to air filtration assemblies for turbine systems, and more particularly, to the use of air filtration assemblies to build and consult an intelligent model of particulate presence and accumulation within gas turbine systems to relate the accumulation of particles to an overall cost to replace, perform maintenance, and/or to recommend mitigation actions.

Embodiments of the invention may be configured for use with variety of sensors. In some embodiments, the invention may be used with air filtration assemblies that include electrostatic sensors that may detect charged particles, other embodiments may be configured for use with other types of sensors, including, but not limited to, infrared, acoustic wave, optical, laser and the like.

Moreover, while the embodiments disclosed herein are described with respect to turbine systems, e.g., gas/combustion turbines, it is to be understood that embodiments of the present invention may be applicable to other fields/systems/processes in which an apparatus is subjected to environmental conditions and/or repetitive stresses that may detrimentally apparatus health/longevity. Certain embodiments may be configured for use with aero/marine, hydrogen/ammonia, etc. based turbine applications.

The intelligent model utilizes equations and algorithms to interpret particle accumulation data to determine the efficiency of the gas turbine system, revenue loss, and/or other costs associated with performing maintenance, replacing components of the gas turbine system, and taking other mitigation actions. In embodiments, the intelligent model may update in real time, iterating the interpreted data based on data measurements taken in quick succession. Accordingly, "real time" as used herein, means a level of processing responsiveness that a user senses as sufficiently immediate, or that enables a processor to keep up with an external process.

In certain embodiments, the intelligent model may provide an unsupervised self-learning approach to tell when turbine components are inherently in a different state as compared to an established baseline. This may be facilitated by a machine learning algorithm that does not require labeled data and/or human intervention to find structure in a dataset.

Reference will be made below in detail to exemplary embodiments of the invention, examples of which are illustrated in the accompanying drawings. Wherever possible, the same reference characters used throughout the drawings refer to the same or like parts.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 shows a schematic view of an illustrative turbine system, e.g., gas turbine system 10, that is configured for use with an embodiment of the invention. Gas turbine system 10 may include a compressor 12 and an air filtration assembly 100 positioned upstream of and in fluid communication with compressor 12. Compressor 12 compresses an incoming flow of filtered air 18 that may be filtered by and flow from air filtration assembly 100 to compressor 12 into a compressed air 20 and ultimately to a combustor 22. Combustor 22 mixes the flow of compressed air 20 with a pressurized flow of fuel 24 and combusts the mixture to create a flow of combustion gases 26. Although only a single combustor 22 is shown, gas turbine system 10 may include any number of combustors 22. The flow of combustion gases 26 is in turn delivered to a turbine 28. The flow of combustion gases 26 drives turbine 28 to produce mechanical work. The mechanical work produced in turbine 28 drives compressor 12 via a rotor 30 extending through turbine 28 and may be used to drive an external load 32, such as an electrical generator.

Gas turbine system 10 may also include an exhaust fluid flow path terminating at an exhaust 34. As shown in FIG. 1, exhaust 34 may be positioned adjacent to turbine 28 of gas turbine system 10. More specifically, exhaust 34 may be positioned adjacent to turbine 28 and may be positioned substantially downstream of turbine 28 and/or the flow of combustion gases 26 flowing from combustor 22 to turbine 28. Subsequent to combustion gases 26 flowing through and driving turbine 28, combustion gases 26 may be exhausted, flow-through and/or discharged through exhaust 34 in a flow direction (D), either to the atmosphere or into a heat recovery steam generator of a combined cycle power plant.

As shown in FIG. 1, air filtration assembly 100 of gas turbine system 10 may include a plurality of sensors, components, devices, and/or systems that may detect when particles are in intake air that may form filtered air 18. In embodiments, air filtration assembly 100 may also include a plurality of vane filters 118 that may filter large particles 112 from intake air 104 and an array of fabric filters 120 positioned downstream of the vane filters 118. The array of fabric filters 120 may be formed as any suitable filtering components and/or devices that may be configured to further filter particles 112, e.g., finer/smaller particulates, from intake air 104 flowing therethrough.

The air filtration assembly 100 shown in FIG. 1 also includes components, devices, and/or systems that may detect undesirable particles 112 in intake air 104, that pass through or beyond the filters 118, 120 due to particle size, filter faults or deficiencies (from tears, holes, improper installation, and/or per solving and recrystallization processes), filter manufacturing defects, and/or operational wear. As will be appreciated, detecting particles 112 within the air inlet duct(s) beyond the vane filters 118 and/or fabric filters 120 may indicate that components of air filtration assembly 100 are not functioning properly and/or may require maintenance, this, in turn, may help reduce/prevent damage caused by particles 112 during operation, and/or may maintain/improve operational efficiencies of gas turbine system 10 by reducing/eliminating the number of undesirable particles 112 included in filtered air 18.

As shown in FIG. 1, an exemplary air filtration assembly 100 may include an electrostatic component 124 positioned in the air inlet duct 102, e.g., positioned within an internal cavity in the form of a filter house or inlet ducting 110 of air inlet duct 102, downstream of the array of fabric filters 120. The electrostatic component 124 may be configured to charge particles 112 that pass through the plurality of vane filters 118 and/or the array of fabric filters 120, and in turn through and/or over electrostatic component 124. The charged particles 113 included in intake air 104 may allow for easier and/or improved detection of particles 113 before particles 113 reach compressor 12 of gas turbine system 10. In embodiments, the sensor(s) 132 discussed herein may detect naturally charged particles 113 without the presence of electrostatic component(s) 124 within the turbine system 10.

In embodiments, the gas turbine system 10 includes a controller 130 and a turbine control system 36. These may be formed or configured as single, stand-alone systems or computing devices that function separately, as discussed herein, and are in communication with one another. Alternatively, controller 130 may be integrally formed within, in communication with and/or formed as a part of turbine control system 36. However embodied, controller 130 and/or turbine control system 36 may be formed of any suitable device and/or system that may be configured to obtain and process information relating to gas turbine system 10 and control the various components of gas turbine system 10 and air filtration assembly 100 and execute embodiments of the present disclosure.

In embodiments, the controller 130 and/or turbine control system 36 may include at least one processor and a memory device. In certain embodiments, the controller 130/turbine control system 36 may be a dedicated process logic controller or a general-purpose computer such as a desktop/laptop and may include, and/or electronically communicate with, a database that stores data. The controller 130 and/or turbine control system 36 may be at the same site/location as the turbine system 10, or in embodiments, located at a different site and may electronically communicate with the turbine system 10 via a communication link, which may be wired and/or wireless.

Referring again to FIG. 1, the air filtration system 100 may also include at least one sensor 132 operably coupled to and/or in operable (e.g., electronic) communication with the controller 130 and/or turbine control system 36. Sensor(s) 132 may be positioned downstream of filtration stages. Additionally, sensor(s) 132 may be positioned upstream of compressor 12 and/or downstream of air inlet duct 102. In the non-limiting example, sensor(s) 132 may be in fluid communication and/or positioned within a conduit 134 fluidly coupling air filtration assembly 100 and compressor 12. In certain embodiments, sensor(s) 132 may be electrostatic and configured to detect the charged particles 113 of intake air 104 that may be naturally charged or previously charged by the matrix of ionizers 126 and flow past sensor(s) 132 (e.g., particulate matter sensor). In embodiments, sensor(s) 132 may be formed as flush-mounted button sensors with high local resolution, multiple button system sensors arranged in a ring, circumferential ring sensors, and the like. Additionally, or alternatively, sensor(s) 132 may be staged in flow direction to increase the detectability of charged particles 113 dragged by the flow by correlating the signals of the different stages together with the flow speed known from the turbine control system 36. It is understood that the location(s) and number of sensor(s) 132 shown in the embodiments may vary and the air filtration assembly 100 may include more or less sensor(s) 132 than those shown in the figures.

Moreover, in embodiments, the system 10 may include both sensors 132 mounted on or at the inlet duct 102 (or in proximity thereto as described above), as well as sensors, e.g., electrostatic or otherwise, mounted on or at the exhaust 34 of the system 10. Turbine operating data from sensors at both locations may be utilized by system 10.

During operation of gas turbine system 10, intake air 104 may flow through air filtration assembly 100 to provide working fluid (e.g., filtered air 18) to compressor 12. Particles 112 included in intake air 104 may undesirably flow through filtering components due to damage and/or defect in the same components.

As naturally charged particles 113 flow out of air filtration assembly 100 and are delivered to compressor 12 via conduit 134, charged particles 113 may be detected by sensor(s) 132. Sensor(s) 132 may detect ingested particles 113 and may provide information to controller 130 and/or control system 36 relating to contaminating particles 112, including, but not limiting to, the amount/concentration of particles 113.

Using this information generated by sensor(s) 132, controller 130 may determine if the amount and/or the type of particles included in filtered air 18 being provided to compressor 12 may damage compressor 12 and/or reduce the operational efficiency of gas turbine system 10. In the non-limiting example where, for instance, the concentration and/or amount of charged particles 113 could or will damage compressor 12, combustor 22, and/or turbine 28, controller 130 may suggest or signal to turbine control system 36 that gas turbine system 10 should be shut down to prevent damage. The inclusion of air filtration assembly 100 with gas turbine system 10 allows for early detection of undesirable particles 112 flowing to compressor 12, which in turn may prevent or reduce damage to compressor 12 by allowing for immediate indication for repair, maintenance, and/or replacement of components of air filtration assembly 100.

Figure 2:
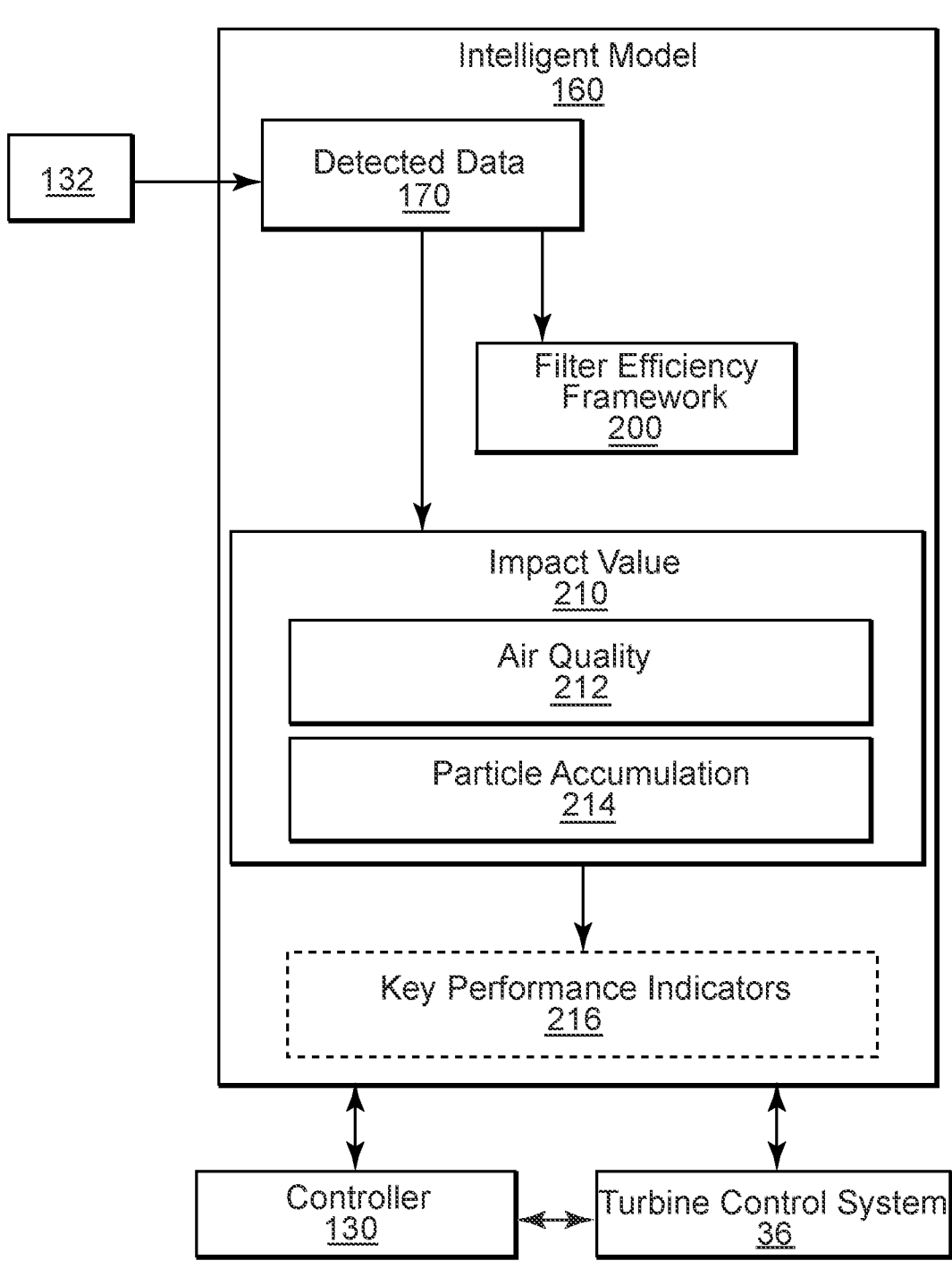
FIG. 2 shows a detailed view of the intelligent model of FIG. 1, including a filter efficiency framework and an impact value, according to embodiments of the disclosure.
Figure 11:
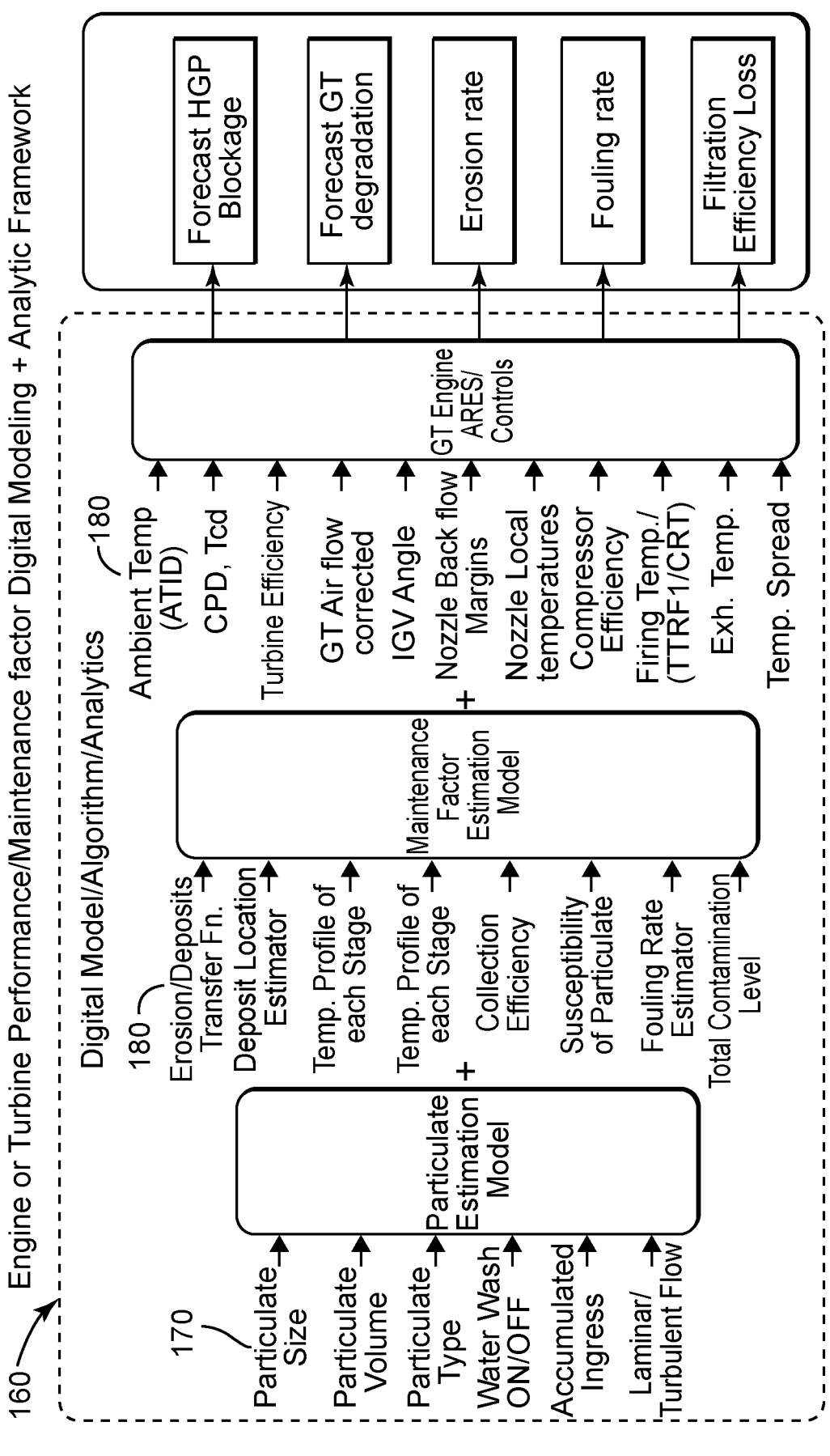
FIG. 11 shows a block diagram of an intelligent model, according to embodiments of the disclosure.

As illustrated in FIGS. 2 and 3, in some embodiments, the intelligent model 160 built by the controller 130 may assess measured data 170 provided by the sensor(s) 132 using a filter efficiency framework 200 and determine an impact value 210. The measured data 170 may be provided by an Inspection Data Management System ("IDMS") or an Engineering Data Management System ("EDMS") and includes the velocity, average size, volume, type, distribution and/or dispersion pattern of the charged particles 113. As illustrated in FIG. 4 in detail, in a non-limiting embodiment, the filter efficiency framework 200 includes a set of equations and algorithms, that allow the controller 130 to analyze the measured data 170 to determine deposition rates, fouling rates, compressor degradation rates, and/or evaluate overall filtration integrity or efficiency. A block diagram of an example of the intelligent model 160 incorporating the measured data 170 and the known data 180 to determine the aforementioned particle deposition rates, particle fouling rates, and/or compressor degradation rates, etc. is depicted in FIG. 11.

In one embodiment, the intelligent model 160 determines a total contaminant level ("TCL" in parts per million by weight, hereafter "ppmw") according to the following equation:

$$TCL = I_f + [I_{air} \times A/F] + [I_w \times W/F] + [I_{stm} \times S/F]$$

where $I_f$ is the contaminant level in the fuel (ppmw), $I_{air}$ is the contaminant level in the air (ppmw), $I_w$ is the contaminant level in the injection water (ppmw), $I_{stm}$ is the contaminant level in the injection steam (ppmw), A/F is the air to fuel ratio for the gas turbine, S/F is the steam to fuel ratio, and W/F is the water to fuel ratio. The particle behavior is captured by the Stokes number St, where:

$$St = \frac{\rho_p d_p^2 U}{18\mu \cdot 2L}$$

-continued $$L = s \, \sin(\beta_b - \beta_1)$$

Larger particles, with a larger Stokes number St, will show greater deviations from the gas flow path, and will therefore impact more frequently on the pressure side of the blade. As a result, the capture rate E, increases with the Stokes number St according to:

$$E = 0.08855 \cdot St - 0.0055$$

The diffusion of particles in laminar flow within a tube of radius R, can be described by:

$$n/n_o = 1 - 2.56 \cdot \left(\frac{Dx}{R^2 U}\right)^{\frac{2}{3}} + 1.2 \cdot \left(\frac{Dx}{R^2 U}\right) + 0.0177 \left(\frac{Dx}{R^2 U}\right)^{4/3}$$

where n is the number of particles out of an initial $n_0$ particles that is not captured by the tube walls after traveling a distance x along the tube and D is the diffusion coefficient, which depends on the particle size and flow velocity, among other things. Similar equations describe the diffusion for flows in channels with parallel walls.

In embodiments, experimental data 190 for air flow in a tube, indicating that the particle flux I (i.e., the flow of particles per surface area and time) to the tube walls is described by:

$$\frac{I}{N_0} = \frac{D^{\frac{3}{4}} Re_f^{\frac{7}{8}} v^{\frac{1}{4}}}{90 \cdot r_{particle}} = \frac{D^{\frac{3}{4}} U_f^{\frac{7}{8}} v^{-\frac{5}{8}}}{90 \cdot \left(r_{particle}/L^{\frac{7}{8}}\right)}$$

for a constant amount $N_0$ of particles in the air, increasing flow velocity and reducing relative particle size both lead to increased deposition rates. This means, in particular, that the larger the blade dimension L for a given particle size, the higher the deposition rate. Therefore, a larger compressor has a higher particle accumulation for a given particle size distribution than a smaller compressor. The performance of a compressor stage with increased surface roughness, when compared to a smooth stage, encounters significant deterioration (with a surface roughness equivalent to about:

$$k_s/c = 0.714 \times 10^{-3} (k_s = 40 \ \mu m)$$

The degradation is determined mainly by the roughness on the suction side. For a typical compressor blade in an industrial gas turbine with a 100 mm chord length, this is equivalent to a surface roughness of 71 μm.

A relationship for fouling exists that combines the geometric and aero-thermal characteristics of the engine compressor 12. It is derived based on considerations of the entrainment efficiency of a cylinder due to inertial deposition corrected to the entrainment efficiency of a row of airfoils due to inertial deposition:

$$ISF = \frac{W c_p \Delta T_{stage}}{(1 - r_h^2) D_c^3} \cdot 10^{-6}.$$

The susceptibility of a given engine to particles of a certain size is:

$$\lambda = ISF \cdot \frac{\rho_p \cdot d_p^2}{\eta_f}.$$

Larger, heavier particles have a higher chance than small particles to collide with the blade surface and the model predicts a higher susceptibility of smaller gas turbines to fouling, with some impact of higher stage loading. Fouling is closely related to the geometric and flow characteristics of the axial compressor stage. Adhesion of particles to blades (defined as the cascade collection efficiency) is increased with a decrease of chard length and an increase of solidity. Furthermore, fouling is increased with reduced flow rates, which are closely related to the incoming air velocities. Large particles increase the cascade collection efficiency. Deposition of large particles in front stages makes fouling dominant in front stages, but small particles pass through the front stages and influence downstream compressor stages. Particle size distribution is an important parameter that influences the extent of the fouling.

The collection efficiency is inversely affected by particle size and flow velocity, i.e., the smaller the particle and the slower the airflow, the higher the deposition rate becomes. For an airfoil of chord length L, the collection efficiency for the diffusion process becomes:

$$\lambda = 3\frac{\left(\frac{8hDR}{3U}\right)^{2/3}}{2h^2} = 2.884\frac{\left(\frac{DR}{U}\right)^{2/3}}{h^{4/3}}$$

with $U$ being the free stream flow velocity, D being the diffusion coefficient, R being the maximum thickness of the blade, and h being the blade to blade distance. Wider spaced blades and higher flow velocity both lower collection efficiency. It must be determined which factors affect the diffusion coefficient D. If the majority of diffusion is turbulent diffusion (which is orders of magnitude larger than laminar diffusion and is driven by turbulent eddies) it can be assumed that the diffusion rate is determined by the turbulence rate in the flow. The fouling index FI is expressed by:

$$FI = \frac{P_{GT}}{Wc_p\Delta T} \approx \frac{P_{GT}}{P_{compr}}.$$

A wide range of gas turbines has been studied to evaluate their sensitivity to an imposed level of fouling. The results indicate that the net work ratio (NWR/W$_t$) is indicative of both the gas turbine's susceptibility to foul and its sensitivity to the effects of fouling. Low net work ratio engines where a higher portion of the total turbine work is represented by:

$$\frac{W'_{out}}{W_{out}} = \frac{W_t - W'_c}{W_t - W_c} =$$

$$\frac{W_t\frac{\eta'_c}{\eta_c}W'_c}{W_t - W_c} = \frac{\frac{W_{out}}{NWR} - \frac{\eta_c}{\eta'_c}W_{out}\left(\frac{1}{NWR} - 1\right)}{W_{out}} = \frac{1}{NWR} - \frac{\eta_c}{\eta'_c}\left(\frac{1}{NWR} - 1\right).$$

Figures 5, 6:
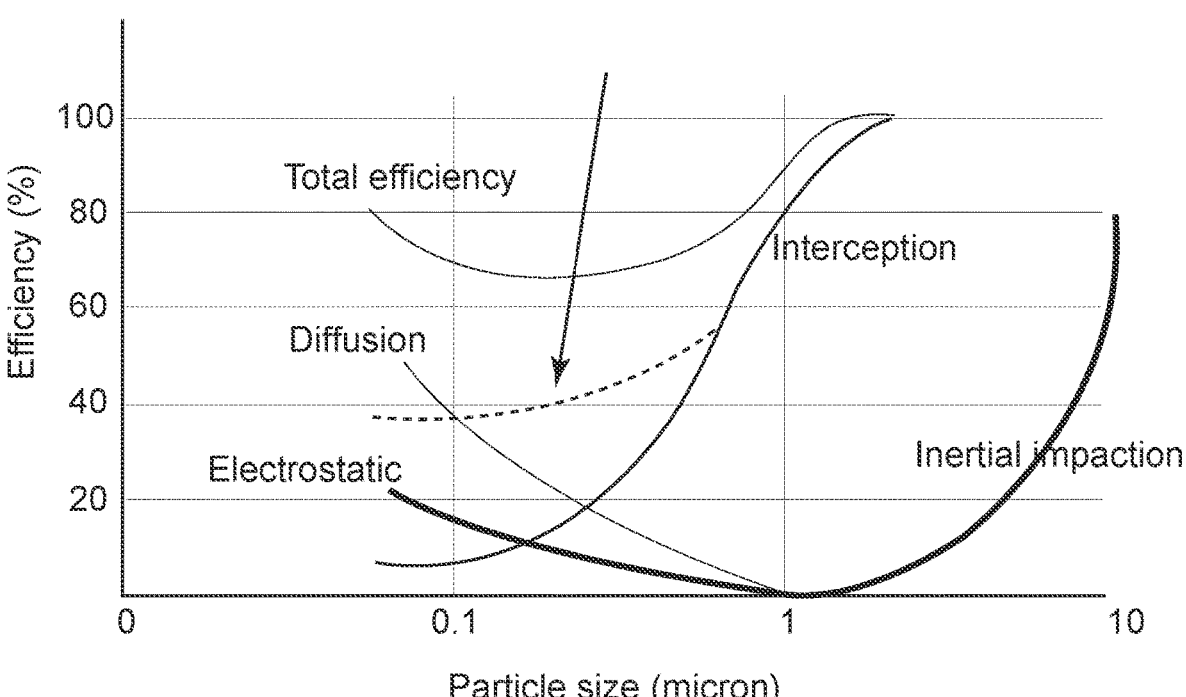
FIG. 5 shows a table of known data consulted by an intelligent model, according to embodiments of the disclosure.
FIG. 6 shows a graph of expected operating life of a filter in an air filtration assembly, according to embodiments of the disclosure.

The filter efficiency framework 200 also includes tables of known data (FIG. 5 depicts an example of a table of known data relating the geometric mean particle size of the particles 113 to a particle size removal efficiency that may be provided and/or updated by the intelligent model 160. The efficiency the particle removal capability of a filter is expressed as:

$$Efficiency = \frac{R_{entering} - R_{leaving}}{R_{entering}} \cdot 100$$

$$Penetration = \frac{R_{leaving}}{R_{entering}} \cdot 100$$

$$Penetration = 100 - Efficiency.$$

When a new filter loses the charge mechanism, the efficiency drops significantly (see dashed line in FIG. 6, for example). The efficiency takes different names depending on whether the quantity R, relates to a mass or number of particles. An arrest efficiency, determined when the quantity R is a mass or weight is expressed as:

$$Arrestance(A) = \frac{W_{entering} - W_{leaving}}{W_{entering}} \cdot 100.$$

Although the ratio of small particles to large particles is in the range of a million to one, large particles account for most of the weight. As a result, only low efficiency filters (i.e., pre-filters) are discussed in terms of arrest. The Dust Holding Capacity ("DHC"), in g/m$^2$, or the average weight of test dust per unit area the filter in question can hold at an established pressure drop is defined by:

$$DHC = W_{total} - A_{avg}.$$

FIG. 7 provides a table of sample average minimum composite efficiency values (in relevant Standards including: ANSI—American National Standards Institute, ASHRA—American Society of Heating, Refrigerating and Air Conditioning, etc.) for controlled particles of various sizes that are consulted in some example embodiments of the filter efficiency framework 200.

The controller 130 may adjust operation of the controller 130, the turbine control system 36 (e.g., control the Advanced Power Management or APM of the gas turbine 10), and/or may alert an operator depending on the determined data provided by analysis using the filter efficiency framework 200. The intelligent model 160 utilizes the filter efficiency framework to determine the total accumulated dirt-load, estimate dirt-load over time, the filtration efficiency, forecast degradation, fouling rates, and/or erosion rates. The determined total accumulated dirt load allows the intelligent model 160 to establish a remaining lifetime of the gas turbine system 10 versus the fired hours and the dirt-load. If the estimated dirt-load over time is too high, the intelligent model 160 may recommend and/or command an online wash, until the conditions have passed or increase the pulsing frequency of the wash to remove more sand/dirt from the components, etc. If the determined filtration efficiency is too low, the intelligent model 160 may signal the controller 130 to send an alarm to the operator to indicate that something is wrong (e.g., filter bypass, misalignment, bursting open, etc.) and/or may recommend an alternate component for improved operability and filter selection. If the intelligent model 160 determines forecast degradation, fouling rates, and/or erosion rates that exceed a desired threshold then a different or better wash cycle, maintenance, and/or updating a liberation forecast prediction may be necessary. These actions may ultimately be designated to occur during an optimized planned shutdown at a later time.

As illustrated in FIG. 4, the intelligent model 160 utilizes the filter efficiency framework 200 to analyze the measured data 170 to evaluate data related to the compressor 12 (e.g., compressor air flow speed, compressor efficiency, etc.), inlet filtration design parameters, filtration efficiency, inlet filtration differential pressure ("DP"), operating hours, debris monitoring, and/or debris composition (e.g., Si, Ca, S, Fe, etc.). The filter efficiency framework 200 utilizes equations and algorithms, based on the measured data 170, to determine the debris projected particulate count, volume, and distribution. Using the filter efficiency framework 200, the intelligent model 180 may compare the existing filtration rated performance numbers to the debris particle size and accumulated volume to identify possible leakage of filtration locations and estimate possible ingress totals or a dirt load for continued operation of the gas turbine system 10 (e.g., continued fuel fire heater or FFH operation). The dirt load estimation on the ambient side is determined based on the particulate concentration on the ambient side multiplied by the rate of air flow multiplied by the number of hours of operation. The dirt load estimation on the clean side is determined based on the particulate concentration on the clean side multiplied by the rate of air flow multiplied by the number of hours of operation. The filter efficiency framework 200 allows the intelligent model 160 to compare dirt side or ambient side sensing system particle data and clean side sensing system particle data with the expected efficiency performance data of the installed filtration assembly 100, such as that depicted in FIG. 7. The controller 130 may take a variety of actions depending on whether the dirt load estimation on the clean side exceeds a specific target value.

Figure 9A:
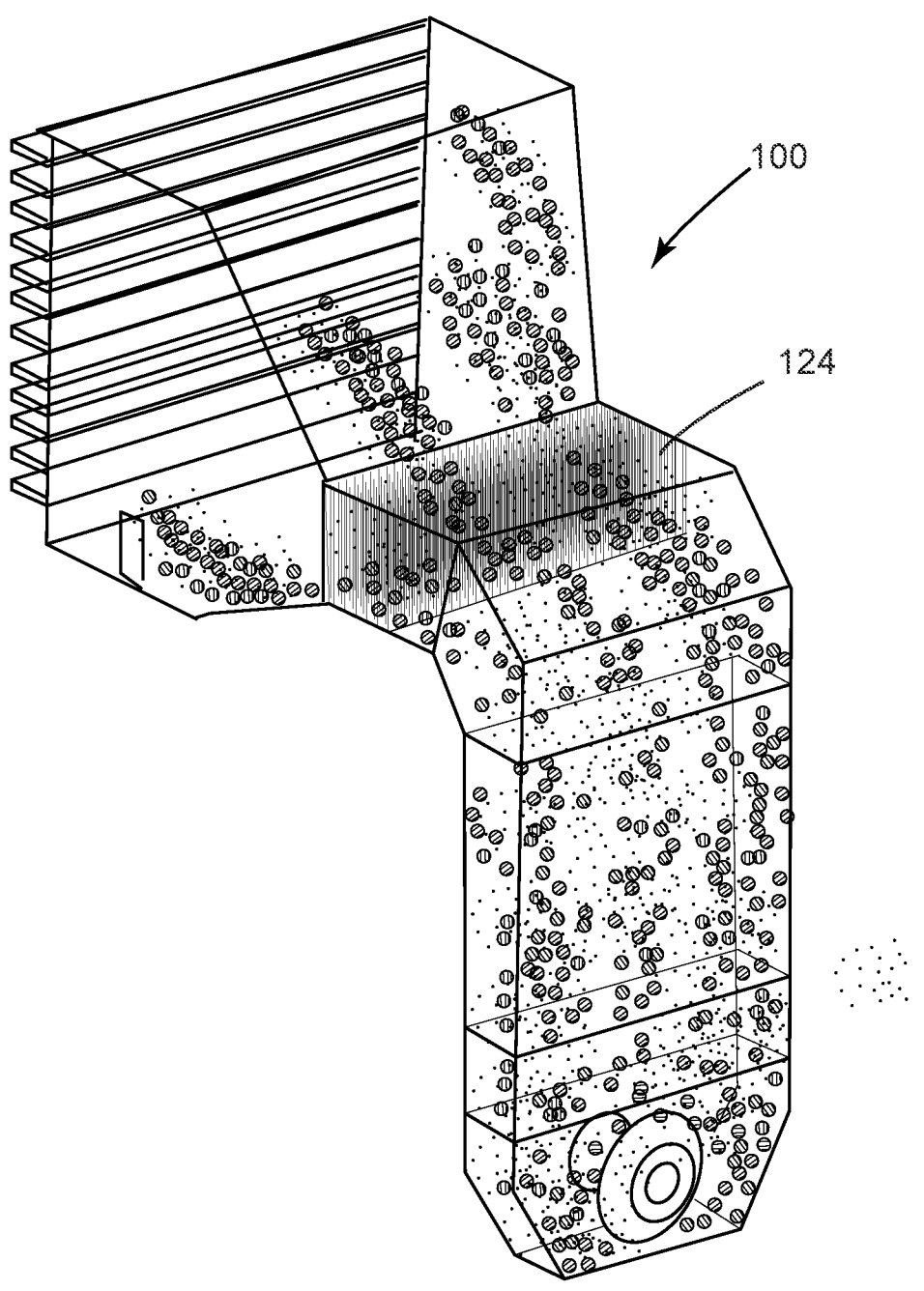

As illustrated in FIGS. 9A and 9B, in some examples, the intelligent model 160 uses the filter efficiency framework 200 to pinpoint locations of leakage within the air filtration assembly 100 or to identify other fluid flow transfer tubes and pinpoint components within the gas turbine system 10 that are operating in a diminished capacity or are otherwise compromised (i.e., if a component in the gas turbine system 10 is not functioning at full and/or desired capacity). A graphical presentation of the determinations made by the intelligent model 160 based on the filter efficiency framework is depicted, for example, in FIG. 9B. The filter efficiency framework 200 allows the controller 130 to analyze inlet filter differential pressure variation profiling with respect to the collected debris, identify possible segments of the gas turbine system 10 containing a filtration leak compared to an offline computational fluid dynamic evaluation ("CFD Evaluation"), and estimate risk of further damage to specific components of the gas turbine system 10 over a set period of time. The filter efficiency framework 200 may provide a self-learning knowledge base of computational fluid dynamic profiles, signatures from fleet studies, or other data to allow comparison with measured data 170 detected within the gas turbine system 10. The intelligent model 160 provides for a number of sensors that may include data such as particle count, particle dimension, percentage or volume of particle detection, total dirt load, and/or customized expected particulate data or analysis that may be compared with the self-learning knowledge base of the filter efficiency framework 200. This comparison may indicate a possible location of a leak, a possible category of a leak, a possible duration of a leak, and/or a possible dirt load accumulated.

Figure 8:
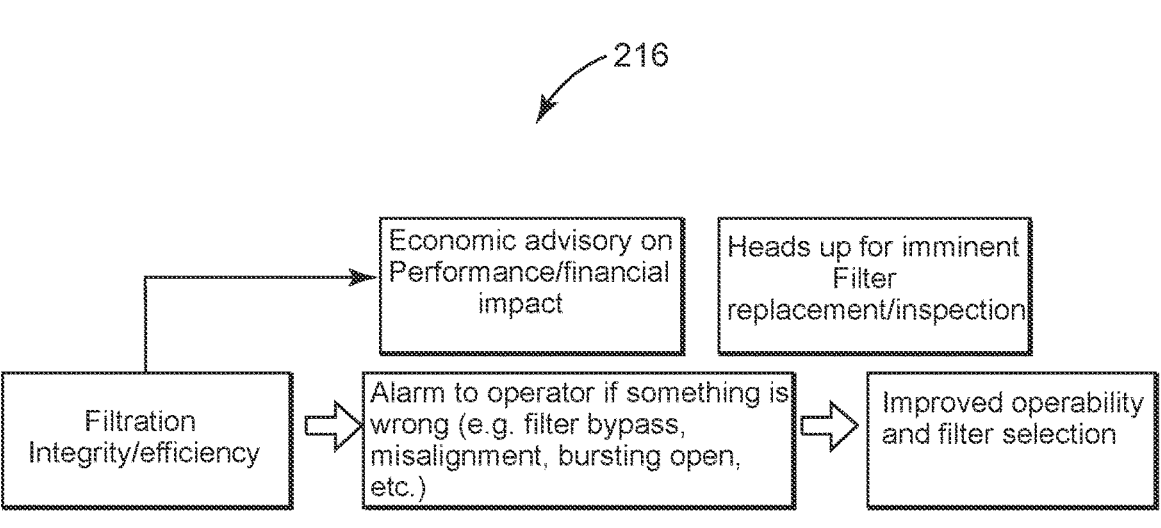
FIG. 8 shows an example of key performance indicators determined by an intelligent model, according to embodiments of the disclosure.

As illustrated in FIGS. 2, 5, and 8, in some embodiments, a specific determination provided by the analysis using the filter efficiency framework 200 is an impact value 210, which quantifies the impact of both air quality 212 and particle accumulation 214 on the overall operation of the gas turbine system 10. The air quality 212 is determined based on the amount, type, and dispersion pattern of particles within the airflow (as captured by the measured data 170). Particle accumulation 214 includes both particles that accumulate on the filters (e.g., vane filters 120 and fabric filters 122) that directly impact the operational efficiency of the filters and particles that accumulate on other surfaces within the air filtration assembly 100 that otherwise affect the fluid flow path to ultimately impede the efficiency of the air filtration assembly 100.

As illustrated in FIGS. 2 and 10, in some embodiments, the intelligent model 160 may utilize the impact value 210 to derive key performance indicators 216 of the gas turbine system. The key performance indicators 216 provide advisory analytics to the operator of the gas turbine system 10 including, but not limited to, revenue loss due to inefficient operation of the gas turbine system 10, cost of replacing elements of the gas turbine system 10 that are functioning at a diminished capacity (e.g., filter bypass, misalignment, bursting open, etc.), and/or cost of shutdowns of the gas turbine system 10 to replace components or conduct other maintenance. The key performance indicators 216 may make suggestions to minimize forced outages of the gas turbine system 10 due to particles entering the inlet filtration and/or foreign object debris ingress to the gas turbine system 10. The intelligent model 160 may recommend mitigation action depending on the determined impact value 210. As illustrated in FIG. 10, in some embodiments, the key performance indicators 216 provide for the economic impact (e.g., loss in revenue due to power and/or performance impact, loss in revenue due to inefficient fuel consumption, etc.) and the cycle time impact (e.g., scheduling of maintenance, shutdown, and/or inspection; scheduling of filter replacement; scheduling of flange and duct inspections, etc.). The key performance indicators 216 may consider data of the gas turbine system 10 in the form of cycles per degree ("CPD"), coil tubing measurement ("CTM"), critical power ratio ("CPR"), etc.

By way of non-limiting examples, the mitigation actions include recommending inspection, replacement, and/or choosing similar elements for replacement in the gas turbine system 10 (e.g., recommending different types and/or efficiencies of filter elements depending on the measured data 170 recorded by the sensor(s) 132 to improve operability of the gas turbine system 10, etc.).

The mitigation actions may also include recommending and/or forcibly initiating a cleaning or online wash of the filter elements (cleaning the filter elements during operation of the gas turbine system 10), increasing the frequency of a wash, and/or pulsing the wash to remove particulates such as sand and dirt until the specific conditions have passed (i.e., until the measured data 170 of particulates reaches a desired level). In embodiments, the mitigation actions suggested by the intelligent model 160 help to address engine maintenance, erosion, corrosion, and/or component failure mitigation. The intelligent model 160 allows the operator to perform predictive maintenance on the gas turbine system 10 and replace elements of the gas turbine system 10 in a manner and/or during a time period that would be the least costly to operation of the gas turbine system 10. The intelligent model 160 may be incorporated into an overall heavy duty gas turbine health advisory system.

In embodiments, the intelligent model 160 and the determined impact value 210 greatly benefit large gas turbines 10 operating in harsh operating environments (e.g., power plants operated in arid regions and/or close to a marine coastline) where higher availability, reliability, and power output of the gas turbines 10 is expected by the operators. The cost of forced outages and replacement hot gas parts (i.e., components within the hot fluid flow path of the gas turbine system 10) are particularly high for these gas turbine systems 10.

Although discussed herein as being formed in air inlet duct 102, it is understood that at least a portion of the components of air filtration assembly 100 discussed herein with respect to FIGS. 1-10 may be positioned within and/or directly downstream of distinct portions and/or components of gas turbine system 10. For example, at least a portion of air filtration assembly 100 may be positioned within combustor 22 and/or downstream compressor 12 to filter particles 112 from the fluid (e.g., air) utilized by combustor 22, as discussed herein.

Technical effects of the disclosure include providing systems and methods for controllers building and consulting intelligent models of particulate presence and accumulation within gas turbine systems to quantify an operational efficiency of the gas turbine system, identify a location of possible leakage, estimate a total amount of ingress of particles, identify components of the gas turbine system that may be operating in a diminished capacity, estimate a risk of damage to components of the gas turbine system, and/or recommend mitigation actions.

Finally, the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, the system 10 may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory (DRAM), which typically constitutes the main memory. Common forms of computer-readable media include, for example, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Further aspects of the invention are provided by the subject matter of the following clauses:

1. A system for assessing the efficiency and integrity of an inlet filtration system of a turbine, the system comprising one or more sensors operative to generate at least one measured data value of air intake particles within a fluid flow path of the turbine; a controller in electronic communication with one or more sensors and operative to utilize an intelligent model to process the at least one measured data value, the intelligent model consulting a filter efficiency framework, and wherein system uses the filter efficiency framework to relate the at least one data value of the air intake particles to a filter efficiency of the air filtration system of the turbine.

2. The system of clause 1, wherein the system uses the filter efficiency framework to identify a location of possible leakage in the turbine system.

3. The system of clause 2, wherein the system uses the filter efficiency framework to derive an expected data value of an air intake particle using computational fluid dynamics and to compare the at least one data value of the air intake particles to the expected data value of the air intake particle to identify the location of possible leakage in the air filtration assembly.

4. The system of clause 1, wherein the system uses the filter efficiency framework to estimate an amount of total ingress of particles over a set time period.

5. The system of clause 1, wherein the system uses the filter efficiency framework to identify a component of the turbine system that is operating in a diminished capacity.

6. The system of clause 1, wherein the system uses the filter efficiency framework to estimate a risk of damage to at least one component of the turbine system if the turbine system continues to operate for a set period of time.

7. The system of clause 1, wherein the intelligent model determines an impact value based on the at least one measured data value, the impact value including an efficiency of flow of intake air and an effect of particle accumulation, and wherein the impact value quantifies an operational efficiency of the turbine system.

8. The system of clause 7, wherein the impact value includes a key performance indicator that provides quantifiable advisory analytics to an operator of the turbine system, and wherein the advisory analytics include at least one of minimizing the revenue loss, minimizing the cost of replacing a component of the turbine system, and minimizing the cost of shutdown of the turbine system.

9. The system of clause 8, wherein the key performance indicator recommends a mitigation action including at least one of recommending inspection of a component of the turbine system, recommending replacement of a component of the turbine system, and recommending replacement of a component of the turbine system with an alternate component.

10. The system of clause 9, wherein the mitigation action further comprises at least one of recommending a cleaning of a component of the turbine system, forcing a cleaning of a component of the turbine system, and establishing or updating a frequency of a cleaning of a component of the turbine system.

11. The system of clause 1, wherein at least one sensor is placed within an exhaust fluid flow path of the turbine system to generate at least one measured data value of air exhaust particles within the exhaust fluid flow path.

12. The system of clause 11, wherein the controller utilizes the intelligent model to verify at least one measured data value of air intake particles with the at least one measured data of air exhaust particles.

13. The system of clause 1, wherein the one or more sensors include at least one sensor that detects at least one measured data value of air intake particles.

14. The system of clause 1, wherein the one or more sensors include at least one of an infrared sensor, an acoustic wave sensor, an optical sensor, and a laser sensor.

15. The system of clause 1, wherein the system modifies the intelligent model over a set period of time.

16. A method of quantifying an effect of continued fluid flow within an air filtration assembly of a turbine system, the method comprising consulting an intelligent model of fluid flow tailored to the turbine system; determining an impact value using the intelligent model of fluid flow based on at least one detected data value of an air intake particle traveling through a fluid flow path of the turbine system; calculating a key performance indicator from the impact value; and notifying an operator of the turbine system of the key performance indicator and wherein the key performance indicator provides quantifiable advisory analytics of at least one of a revenue loss due to inefficient operation of the turbine system, a cost of replacing an element of the turbine system, and a cost of a shutdown of the turbine system for a set time period.

17. The method of clause 16, wherein the intelligent model notifies the operator of an optimal key performance indicator that minimizes at least one of the revenue loss, the cost of replacing a component of the turbine system, and the cost of shutdown of the turbine system.

18. The method of clause 16, further comprising recommending a mitigation action to the operator after the step of notifying the operator of the turbine system of the key performance indicator wherein the mitigation action includes at least one of recommending inspection of a component of the turbine system, recommending replacement of a component of the turbine system, and recommending replacement of a component of the turbine system with an alternate component.

19. The method of clause 18, wherein the mitigation action further comprises at least one of recommending a cleaning of a component of the turbine system, forcing a cleaning of a component of the turbine system, and establishing or updating a frequency of a cleaning of a component of the turbine system.

20. A controller for a turbine system, the system having at least one sensor, the controller operative to receive at least one measured data value of air intake particles; and process the at least one data value via an intelligent model to generate an impact value including an efficiency of flow of intake air and an effect of particle accumulation on the turbine system, and wherein the impact value relates the at least one measured data value to an operational efficiency of the turbine system.

21. The controller of clause 20, wherein the impact value derives a key performance indicator that provides quantifiable advisory analytics to an operator of the turbine system.

22. The controller of clause 20, wherein the intelligent model recommends a mitigation action to the operator of the turbine system including at least one of recommending inspection of a component of the turbine system, recommending replacement of a component of the turbine system, and recommending replacement of a component of the turbine system with an alternate component.

23. The controller of clause 22, wherein the mitigation action further comprises at least one of recommending a cleaning of a component of the turbine system, forcing a cleaning of a component of the turbine system, and establishing or updating a frequency of a cleaning of a component of the turbine system.

24. The controller of clause 20, wherein the intelligent model uses a filter efficiency framework to pinpoint at least one of a potential location of leakage within the turbine system or to identify a potential component of the turbine system that is operating in a diminished capacity.

25. The controller of clause 24, wherein the intelligent model uses the filter efficiency framework to estimate a risk of damage to at least one component of the turbine system if the turbine system continues to operate for a set period of time.

While in embodiments, the execution of sequences of instructions in a software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for assessing the efficiency and integrity of an inlet filtration system of a turbine, the system comprising:
   one or more sensors operative to generate at least one measured data value of air intake particles within a fluid flow path of the turbine;
   a controller in electronic communication with one or more sensors and operative to:
   utilize an intelligent model to process the at least one measured data value, the intelligent model consulting a filter efficiency framework,
   wherein the system for assessing the efficiency and integrity of an inlet filtration system of a turbine is configured to use the filter efficiency framework to relate the at least one data value of the air intake particles to a filter efficiency of the air filtration system of the turbine,
   wherein the system for assessing the efficiency and integrity of an inlet filtration system of a turbine is configured to use the filter efficiency framework to identify a location of possible leakage in the system for assessing the efficiency and integrity of an inlet filtration system of a turbine,
   wherein the controller is configured to compare the location of possible leakage in the system for assessing the efficiency and integrity of an inlet filtration system of a turbine with an offline computational fluid dynamic evaluation to estimate a risk of further damage to at least one component of the system,
   wherein the controller is configured to determine a dirt load estimate based on a particulate concentration multiplied by a rate of air flow multiplied by a number of hours of operation,
   wherein the intelligent model is configured to utilize the filter efficiency framework to determine one or more of a forecast degradation, a fouling rate, and/or an erosion rate.

2. The system of claim 1, wherein the system uses the filter efficiency framework to identify a duration of possible leakage in the turbine system.

3. The system of claim 1, wherein the system uses the filter efficiency framework to derive an expected data value of an air intake particle using computational fluid dynamics and to compare the at least one data value of the air intake particles to the expected data value of the air intake particle to identify the location of possible leakage in the air filtration assembly.

4. The system of claim 1, wherein the system uses the filter efficiency framework to estimate an amount of total ingress of particles over a set time period.

5. The system of claim 1, wherein the system uses the filter efficiency framework to identify a component of the turbine system that is operating in a diminished capacity.

6. The system of claim 1, wherein the system uses the filter efficiency framework to estimate the risk of damage to the at least one component of the turbine system if the turbine system continues to operate for a set period of time.

7. The system of claim 1, wherein the intelligent model determines an impact value based on the at least one measured data value, the impact value including an efficiency of flow of intake air and an effect of particle accumulation, and
   wherein the impact value quantifies an operational efficiency of the turbine system.

8. The system of claim 7, wherein the impact value includes a key performance indicator that provides quantifiable advisory analytics to an operator of the turbine system, and
   wherein the advisory analytics include at least one of minimizing the revenue loss, minimizing the cost of replacing a component of the turbine system, and minimizing the cost of shutdown of the turbine system.

9. The system of claim 8, wherein the key performance indicator recommends a mitigation action including at least one of recommending inspection of a component of the turbine system, recommending replacement of a component of the turbine system, and recommending replacement of a component of the turbine system with an alternate component.

10. The system of claim 9, wherein the mitigation action further comprises at least one of recommending a cleaning of a component of the turbine system, forcing a cleaning of a component of the turbine system, and establishing or updating a frequency of a cleaning of a component of the turbine system.

11. The system of claim 1, wherein at least one sensor is placed within an exhaust fluid flow path of the turbine system to generate at least one measured data value of air exhaust particles within the exhaust fluid flow path.

12. The system of claim 11, wherein the controller utilizes the intelligent model to verify at least one measured data value of air intake particles with the at least one measured data of air exhaust particles.

13. The system of claim 1, wherein the one or more sensors include at least one electrostatic sensor that detects at least one measured data value of air intake particles.

14. The system of claim 1, wherein the one or more sensors include at least one of an infrared sensor, an acoustic wave sensor, an optical sensor, and a laser sensor.

15. The system of claim 1, wherein the system modifies the intelligent model over a set period of time.

16. A method of quantifying an effect of continued fluid flow within an air filtration assembly of a turbine system, the method comprising:
   consulting an intelligent model of fluid flow tailored to the turbine system;
   determining an impact value using the intelligent model of fluid flow based on at least one detected data value of an air intake particle traveling through a fluid flow path of the turbine system;
   determining a location of a possible leakage in the system using the intelligent model of fluid flow;
   calculating a key performance indicator from the impact value;
   comparing the location of the possible leakage in the system with an offline computational fluid dynamic evaluation to estimate a risk of further damage to at least one component of the system; and
   notifying an operator of the turbine system of the key performance indicator,
   wherein the key performance indicator provides quantifiable advisory analytics of at least one of a revenue loss due to inefficient operation of the turbine system, a cost of replacing an element of the turbine system, and a cost of a shutdown of the turbine system for a set time period.

17. The method of claim 16, wherein the intelligent model notifies the operator of an optimal key performance indicator that minimizes at least one of the revenue loss, the cost of replacing a component of the turbine system, and the cost of shutdown of the turbine system.

18. The method of claim 16, further comprising:

recommending a mitigation action to the operator after the step of notifying the operator of the turbine system of the key performance indicator, wherein the mitigation action includes at least one of recommending inspection of a component of the turbine system, recommending replacement of a component of the turbine system, and recommending replacement of a component of the turbine system with an alternate component.

19. The method of claim 18, wherein the mitigation action further comprises at least one of recommending a cleaning of a component of the turbine system, forcing a cleaning of a component of the turbine system, and establishing or updating a frequency of a cleaning of a component of the turbine system.

20. A controller for a turbine system, the system having at least one sensor, the controller operative to:

receive at least one measured data value of air intake particles; and process the at least one data value via an intelligent model to generate an impact value including an efficiency of flow of intake air and an effect of particle accumulation on the turbine system, process a filter efficiency framework via the intelligent model to identify a location of possible leakage in the turbine system, compare the location of the possible leakage in the turbine system with an offline computational fluid dynamic evaluation to estimate a risk of further damage to at least one component of the turbine system, determine a dirt load estimate based on a particulate concentration multiplied by a rate of air flow multiplied by a number of hours of operation, and wherein the impact value relates the at least one measured data value to an operational efficiency of the turbine system.

21. The controller of claim 20, wherein the impact value derives a key performance indicator that provides quantifiable advisory analytics to an operator of the turbine system.

22. The controller of claim 20, wherein the intelligent model recommends a mitigation action to the operator of the turbine system including at least one of recommending inspection of a component of the turbine system, recommending replacement of a component of the turbine system, and recommending replacement of a component of the turbine system with an alternate component.

23. The controller of claim 22, wherein the mitigation action further comprises at least one of recommending a cleaning of a component of the turbine system, forcing a cleaning of a component of the turbine system, and establishing or updating a frequency of a cleaning of a component of the turbine system.

24. The controller of claim 20, wherein the intelligent model uses the filter efficiency framework to identify a potential component of the turbine system that is operating in a diminished capacity.

25. The controller of claim 24, wherein the intelligent model uses the filter efficiency framework to estimate the risk of damage to the at least one component of the turbine system if the turbine system continues to operate for a set period of time.

26. The controller of claim 20, wherein the intelligent model is configured to utilize the filter efficiency framework to determine one or more of a forecast degradation, a fouling rate, and/or an erosion rate.

* * * * *